United States Patent
Evens et al.

(10) Patent No.: US 7,151,942 B1
(45) Date of Patent: Dec. 19, 2006

(54) ADVERTISEMENT BROADCASTING FOR PAGING

(75) Inventors: Carl J. Evens, Colorado Springs, CO (US); Joan Harkey, Dunkirk, MD (US); Ralph S. Hoefelmeyer, Colorado Springs, CO (US)

(73) Assignee: MCI, LLC, Basking Ridge, NJ (US)

( * ) Notice: Subject to any disclaimer, the term of this patent is extended or adjusted under 35 U.S.C. 154(b) by 0 days.

(21) Appl. No.: 09/304,787

(22) Filed: May 4, 1999

(51) Int. Cl.
*H04Q 7/20* (2006.01)

(52) U.S. Cl. ............... 455/458; 455/414.1; 455/466; 340/7.41; 340/7.48

(58) Field of Classification Search ............. 455/458, 455/414, 456, 45, 466, 414.1–4; 340/825.52, 340/7.48, 745, 7.46, 7.27, 989, 7.39–7.41; 379/88.18
See application file for complete search history.

(56) References Cited

U.S. PATENT DOCUMENTS

| | | | | |
|---|---|---|---|---|
| 5,241,305 A | * | 8/1993 | Fascenda et al. | 340/7.48 X |
| 5,404,566 A | * | 4/1995 | Wehrmeyer | 455/45 |
| 5,579,535 A | * | 11/1996 | Orlen et al. | 455/456 X |
| 5,594,945 A | * | 1/1997 | Lewis et al. | 340/7.27 |
| 5,664,948 A | * | 9/1997 | Dimitriadis et al. | 340/989 X |
| 5,870,030 A | * | 2/1999 | DeLuca et al. | 340/7.48 |
| 6,060,997 A | * | 5/2000 | Taubenheim et al. | 340/7.48 X |
| 6,114,969 A | * | 9/2000 | Hymel | 340/7.48 |
| 6,208,717 B1 | * | 3/2001 | Yeh et al. | 379/88.18 |
| 6,208,866 B1 | * | 3/2001 | Rouhollahzadeh et al. | 455/456 |
| 6,625,464 B1 | * | 9/2003 | Bandy et al. | 455/45 X |

* cited by examiner

*Primary Examiner*—Matthew D. Anderson
*Assistant Examiner*—Philip J. Sobutka

(57) ABSTRACT

A method for appending advertisements to paging messages may be utilized to reduce or substantially eliminate the fees for paging services paid by paging service customers while allowing companies to easily get their advertisements directly to a specific market or market segment. Alphanumeric pagers may be programmed/reprogrammed to accept advertisements either prior to or after receiving a page. The alpha-numeric pagers may be programmed with an identification code which indicates to the paging service provider that advertisements are acceptable. Accordingly, if an alpha-numeric pager is programmed to accept advertisements, the paging service provider transmits the advertisements with the page.

26 Claims, 4 Drawing Sheets

ADVERTISEMENT BROADCASTING FOR PAGING

BACKGROUND OF THE INVENTION

1. Field of the Invention

The present invention relates to paging services, and more particularly, to transmitting advertisements in conjunction with paging messages.

2. Discussion of the Related Art

In basic one-way paging, an individual who desires to have someone paged simply places a telephone call via any type telephony system such as a land line system or a wireless system. The telephone call is typically routed to an interactive voice response unit (IVR) of the company providing the paging service. The IVR requests certain information from the caller, such as the identification code of the individual to be paged and then provides the caller with a number of options, including the types of paging services available to the individual to be paged, for example, the type of message. Once the particular type of message is selected by the caller, e.g., text, numeric and/or voice, the message is transmitted to a central computer system of the company providing the paging service. The central computer system verifies the identity of the individual being paged and determines the type of paging service the individual has, including whether it is a local service or national service (nationwide). If it is determined that the individual has local service, then the central computer system transmits the message to a transmitting station in the local area which the individual who is to be paged has selected. The transmitting station then broadcasts the message so that the receiver of the paging unit receives the message if it is within the range of the transmitting station. If, however, it is determined that the individual has broader than local service, for example, nationwide service, then the central computer system uplinks the message to a satellite which in turn relays the message to all transmitting stations. Each of the transmitting stations then broadcasts the message. The paging unit will receive the message from the transmitting station it is closest to. Depending on the type of paging unit and how it is programmed, it may be capable of receiving various types of messages.

Enhanced one-way paging units, i.e., units capable of only receiving messages, and enhanced two-way paging units, i.e., units capable of sending messages as well as receiving messages, have the capability to transmit a locator signal back to the central computer system. Since the central computer system receives the locator signal, it knows the present location of the paging unit and can direct messages for that unit to the closest transmitting station rather than as a broadcast message.

Although companies which provide paging services/paging units are continuously improving the quality of the service and the paging units as well as increasing the number of services offered, the largest single customer complaint with paging service today is the cost. Customers are continuously looking for ways to reduce the monthly cost of their paging service. Typically, customers are charged with a recurring monthly fee for leasing the equipment, the monthly service fee, which usually includes some free usage time, and for any additional features that are available, such as voicemail. Over and above these monthly fees, customers are charged for each occurrence of messages that are sent via operator dispatch and each character over their free usage limit. Accordingly, there is a need to reduce the cost of paging services.

SUMMARY OF THE INVENTION

In accordance with one aspect, the present invention is directed to a method for targeted marketing. The method comprises generating unique identification numbers for predetermined paging service subscribers, creating advertisement scripts, and appending advertisement scripts to page messages for paging service subscribers having the unique identification numbers.

In accordance with another aspect, the present invention is directed to a method for appending advertisements to messages received by paging units. The method comprises generating unique identification numbers for predetermined paging service subscribers and storing the numbers in a central database, programming the paging units of the paging service subscribers with the unique identification numbers, creating advertisement scripts, appending advertisement scripts to page messages for paging service subscribers having the unique identification numbers programmed into their paging units, and transmitting the advertisement scripts and messages to paging units having the unique identification numbers.

In accordance with another aspect, the present invention is directed to a method for voice paging. The method comprises converting a voice stream message into a first format signal stream, transmitting the first format signal stream, converting the first format signal stream back into a voice stream message, and replaying the voice stream message.

In accordance with another aspect, the present invention is directed to a method for voice paging. The method comprises converting a voice stream message into a voice object, digitizing the voice object, compressing the digitized voice object, transmitting the compressed, digitized voice object, decompressing the compressed, digitized voice object, converting the digitized voice object into an analog voice signal stream, and replaying the analog voice signal stream.

In accordance with another aspect, the present invention is directed to a method for voice paging. The method comprises converting a voice stream message into a voice object, breaking the voice object into a phoneme stream, tokenizing the phoneme stream, compressing the tokenized phoneme stream, transmitting the compressed, tokenized phoneme stream, decompressing the compressed, tokenized phoneme stream, converting the tokenized phoneme stream back into a phoneme stream, and replaying the phoneme stream.

In accordance with another aspect, the present invention is directed to a method for voice paging and language translation. The method comprises converting a voice stream message which is in a first language into a first format signal stream, translating the first format signal from the first language into a second language first format signal, transmitting the translated first format signal stream, converting the first format signal stream back into a voice stream message, and replaying the voice stream message.

In accordance with another aspect, the present invention is directed to a method for voice paging and language translation. The method comprises converting a voice stream message into a voice object, digitizing the voice object, breaking the digitized voice object into a first phoneme stream, pattern matching each phoneme in the first phoneme stream to preset phonemes stored in memory and outputting a second phoneme stream based on the result of the pattern matching, translating the second phoneme stream from a first language into a second language, tokenizing the second phoneme stream, compressing the tokenized second phoneme stream, transmitting the compressed, tokenized second phoneme stream, decompressing the compressed, tokenized second phoneme stream, converting the second tokenized phoneme stream back into a phoneme stream, and replaying the phoneme stream.

The method for appending advertisements to messages received by paging units in accordance with the present invention provides a means for overcoming the relatively high costs associated with paging services discussed above.

The method of appending advertisements to paging messages of the present invention provides for a reduction in the cost of paging services. Essentially, paging service customers who have pagers capable of receiving alpha numeric text messages have the option of receiving advertisements on their pagers in exchange for a reduction in their paging service fees. In accordance with this method, each time an individual is paged, one or more advertisements either precede or follow the actual message. Each company that desires to advertise through this medium would pay the paging service provider a fee. This fee would defray the cost of providing paging services and the resulting savings to the paging service provider can be passed along to the paging service customers. In this manner, paging service customers may reduce or substantially eliminate paging service fees. The paging service provider can customize how a customer would be credited based on a number of factors including how many advertisers are utilizing this type of advertising medium provided by a given paging service provider and the number of advertisements a customer is willing to receive with each message.

The method of appending advertisements to paging messages of the present invention provides a dual benefit. Appending advertisements to paging messages can reduce or substantially eliminate the cost of paging services to customers while allowing companies to easily get their advertisements directly to a specific market or market segment. Companies can buy advertising time on a paging network as they do today for other communication media such as television, radio, and print. Since it may be easily determined who is receiving paging services, companies can target different groups with advertisements geared to that specific group. For example, residential paging customers could be separated from business paging customers and large business paging customers could be separated from small business paging customers.

The method of appending advertisements to paging messages of the present invention may be easily and inexpensively implemented in existing, currently in-service alpha-numeric pagers. The alpha-numeric pagers may be programmed or re-programmed directly to receive advertisements or may be programmed or re-programmed via over the air programming to receive advertisements.

The method of appending advertisements to paging messages of the present invention may be extended through the use of voice replay. Voice streams of advertisements and/or messages may be converted into a format suitable for transmission and paging units may be equipped with voice synthesizers capable of replaying the advertisements and/or the message in a computer generated vice or the voice of the sender. By utilizing voice replayed messages, people having difficulty reading the relatively small print on the paging unit displays may easily review their messages. In addition, some individuals respond better to verbal stimuli that textual stimuli. Accordingly, the present invention offers the benefit of both.

BRIEF DESCRIPTION OF THE DRAWINGS

The foregoing and other features and advantages of the present invention will be apparent from the following, more particular description of preferred embodiments of the invention, as illustrated in the accompanying drawings. In the drawings, like reference numbers indicate identical or functionally similar elements. Additionally, the left most digit of a reference number indicates the drawing in which the reference number first appears.

DETAILED DESCRIPTION OF THE PREFERRED EMBODIMENTS

The present invention is directed to a method for appending advertisements to messages received by pagers. Essentially, each time an individual is paged, one or more advertisements would either precede or follow the actual message. This type of service would lower or substantially eliminate the cost of paging services. Since advertisements generally comprise textual messages, only pagers capable of receiving alpha-numeric messages would be capable of receiving advertisements. Currently in-use pagers as well as new pagers may be programmed with an identification number, commonly referred to as a capcode, that indicates that this individual has agreed to this particular type of service from a paging service provider. The advertisements, provided by companies or any other entity or individual who desire to utilize this medium for advertising, would be entered into the paging service provider's central computer for broadcast to each pager with the proper capcode. In other words, in addition to being programmed with the advertisements to be transmitted, the central computer is preferably programmed to only broadcast the advertisements to pagers having the proper capcode. At the appropriate time, the advertisements would be transmitted across the paging network to all customers having a pager programmed with the proper capcode.

As stated above, the advertisements may be appended to all messages regardless of the time; however, various other arrangements may be utilized. For example, the advertisements may be broadcast at specific times during the day. Alternately, broadcast of the advertisements may depend on the particular type of service offered by the paging service providers. For example, one plan offered by the paging service providers may provide for no service fee if advertisements are received with every page, while only a minimal reduction in fee is realized in a plan where the advertisements are received with only the first message of the day. In an alternate embodiment, emergency broadcasts or pages indicating an emergency would not have advertisements appended thereto.

In the exemplary embodiment described below, a national paging network is described. It should, however, be understood that the present invention may be easily adapted to any size network including metro, regional, local and statewide local. In addition, the exemplary embodiment is described with respect to advertisements either directly preceding or following regular messages although other arrangements such as mentioned above and may be utilized without substantially modifying the method of the present invention.

Figure 1:
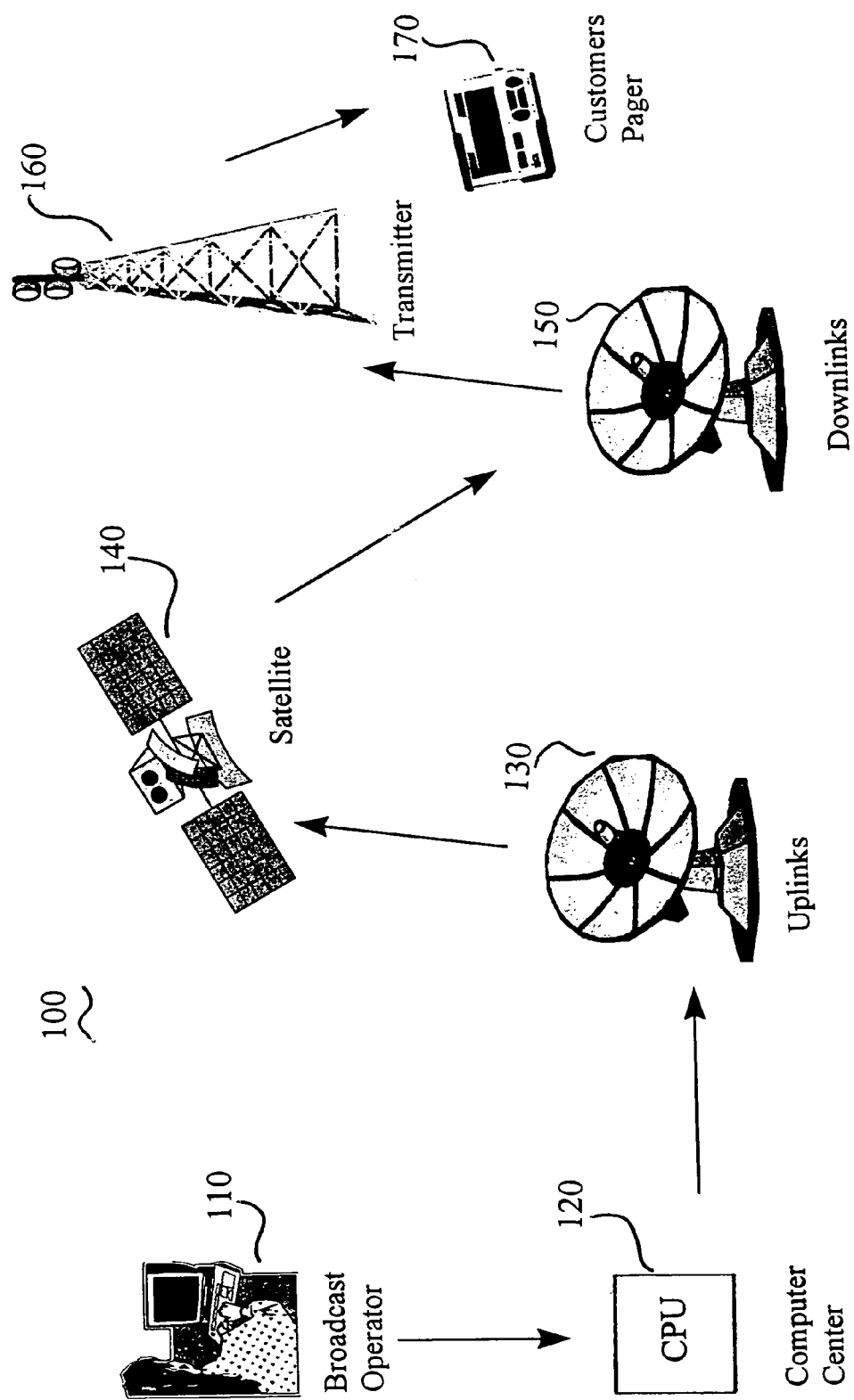
FIG. 1 is a diagrammatic representation of a system for implementing the method of appending advertisements to paging messages in accordance with the present invention.

FIG. 1 is a diagrammatic representation of a system 100 which may be utilized to implement the method of appending advertisements to messages in accordance with the present invention. Typically, a broadcast operator 110, who works for the paging service provider, would receive a script for each advertisement to be broadcast over the network. The script comprises the wording of the advertisement, the dates and times each advertisement should be broadcast and to which paging units it should be broadcast based upon the capcode programmed into the pager. As stated above, companies desiring to advertise through this medium can target different groups with advertisements geared 2 specifically to a particular audience. The targeting may be accomplished through the use of capcodes. The broadcast operator 110 would enter the advertisements at the designated times in a manner analogous to the entry of services such as broadcast news, and submit the message to a central computer 120 indicating that the broadcast is for all pagers programmed with the designated capcode. It should be noted that the central computer 120 comprises a database of the capcodes programmed into each pager. A simple program may be utilized to correlate the capcodes stored in the database with the capcodes of each pager. Accordingly, targeted marketing may be easily achieved through the use of the capcodes.

The central computer 120 may be programmed to accept any number of advertisements and to broadcast the advertisement for receipt by paging units programmed with particular capcodes at various predetermined times. In the exemplary embodiment, the one or more advertisements are broadcast each time a paging unit with a particular capcode is to receive a non-advertisement page. The one or more advertisements may precede or follow the message and preferably precede the message.

The capcode is an identification number which is programmed into the paging unit. The capcode may comprise any number of digits. In the exemplary embodiment, the capcode is a ten digit identification number that is established for this type of service. Depending on the number of advertisements which the paging service customer desires to receive and/or the number of times a day the customer wants to receive advertisements determines which capcode(s) are programmed into an individual's pager. For example, different capcodes may be established depending on the number of advertisements and the frequency of transmission. As stated above, the central computer 120 stores a listing of all capcodes and correlates the advertisements with the appropriate capcodes. The central computer 120 may be updated as new capcodes are developed for new services.

Multiple broadcast capcodes could be created to allow the advertising companies to target the types of customers they would like to reach with their advertisements. For example, residential customers could be separated from business customers and large business customers could be separated from small business customers. In addition to standard advertising, other organizations may also choose to do selective or targeted advertising. For example, political organizations may also desire to advertise.

The capcodes may be programmed directly into the paging units using well-known techniques and conversely, the capcodes may be erased from the paging unit using well-known techniques if the customer no longer desires this type of service. Alternately, customers may have their advertisement broadcast capcode added or removed from their paging units at any time via over the air programming without impacting their normal services.

When an individual is paged, the central computer 120 uplinks the message to a satellite 140 via a satellite transmission uplink station 130. If the paging unit has been programmed with one or more capcodes, the central computer 120 will also uplink one or more advertisements along with the message. As stated above, the advertisements may precede or follow the actual message. The satellite 140 then relays the message and advertisement(s) to a satellite transmission downlink station 150 which in turn relays the message and advertisement(s) to a transmitting station 160. The transmitting station 160 broadcasts the message and advertisement(s) to the pager 170. When the individual reviews his/her message, he or she will also see the advertisement(s), which may be saved or deleted in a manner identical to the saving or deleting of messages. The above-described components are known to individuals skilled in the relevant art.

In a manner analogous to programming the central computer 120 with the particular capcodes which determine the particular advertising scheme involved, the central computer 120 may also be programmed to include promotion codes that will be used during billing to credit the customer's account. During each billing cycle, the billing program will read in the promotion code that is associated with the customer and credit the customer's invoice accordingly. There are many ways in which the customer may receive remuneration for receiving advertisements. The various forms of remuneration would require various promotion codes which would be associated with the forms of remuneration. In addition, the paging service provider may also receive remuneration from the advertisers and the form of remuneration may take on many forms. For example, the paging service provider may charge a flat fee or a percentage of use fee.

If the customer decides at any time that they would no longer want to receive the advertisement broadcast, a customer service representative of the paging service provider could enter a change record into the order entry system to remove the broadcast capcode from the account. The promotion code would also be removed from the account to discontinue the credits. Customers may have the advertisement broadcast capcode added or removed from their pagers at any time via over the air programming without impacting their service.

In an alternate embodiment, in addition to the advertisement appearing as a text message, the advertisement may be broadcast or transmitted as a voice replayed message. In other words, specially designed paging units maybe equipped with voice reproduction devices, for example voice synthesizers, to reproduce the advertisement verbally rather than textually. In yet another alternate embodiment, rather than in addition to the text message, the advertisement may be broadcast or transmitted only as a voice replayed message. In yet another alternate embodiment, the actual message may also be broadcast or transmitted as a voice replayed message.

Figure 2:
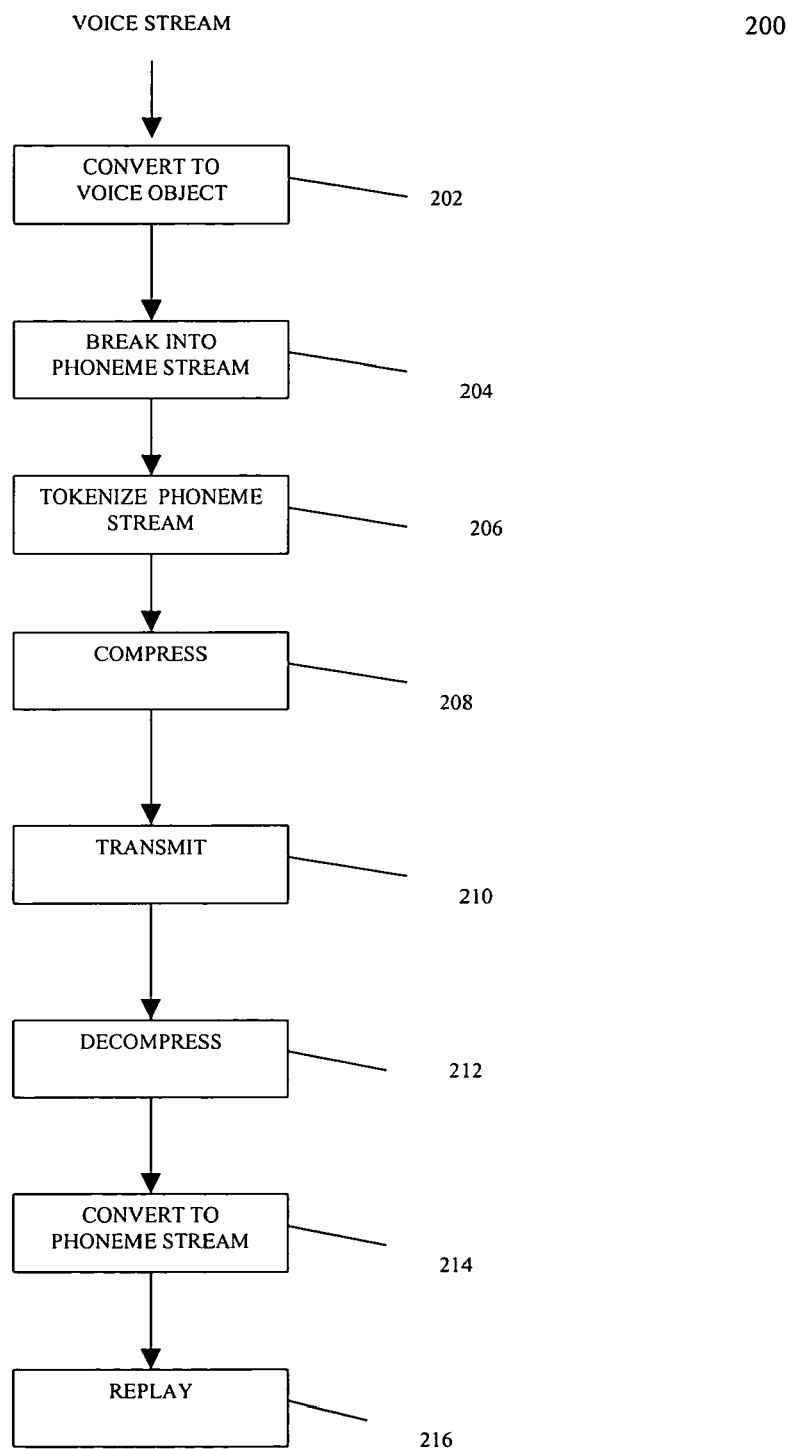
FIG. 2 is a flow chart of an exemplary embodiment of a method for transmitting an advertisement or other message as a non-recognizable voice message in accordance with the present invention.

FIG. 2 is a flow chart 200 illustrating an exemplary embodiment of a method for transmitting an advertisement or any other message as a non-recognizable voice message.

The term non-recognizable voice message as used herein shall mean a generic or computer synthesized voice rather than a human voice. As illustrated in the flow chart 200, a voice stream of the advertisement or message is converted into a voice object as set forth at step 202. The voice object is then broken down into the minimal significant structural units of the particular language as set forth in step 204. These units are commonly referred to as phonemes, and each language has its own set. The phoneme stream is tokenized (create a unique combination of bits) as set forth at step 206. The tokenized phoneme stream is then compressed for transmission as set forth at step 208. Any number of well known compression algorithms may be utilized. The compressed, tokenized phoneme stream is then transmitted as set forth at step 210. The central computer of the paging service provider may be programmed to implement each of the above-described steps. Transmission of this signal may be analogous to the transmission of the textual message or other types of well known message formats currently used in paging. The compressed tokenized phoneme stream is received by the paging unit which comprises a decompression algorithm stored in memory and the stream is decompressed as set forth at step 212. As set forth at step 214, the tokenized phoneme stream is converted back into a phoneme stream utilizing a common phoneme set to that utilized at step 206. The phoneme set is also stored in the memory of the paging unit The phoneme stream may then be replayed by a voice synthesizer in the paging unit as set forth at step 216.

Figure 3:
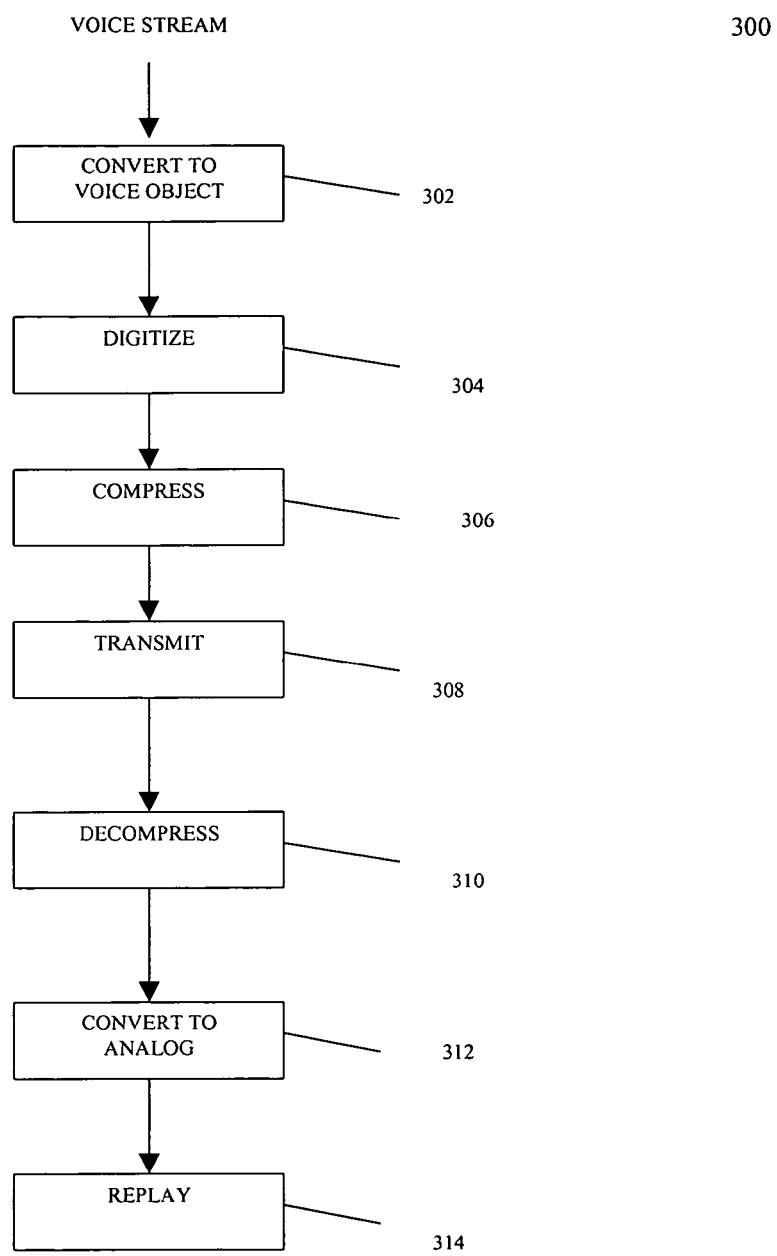
FIG. 3 is a flow chart of an exemplary embodiment of a method for transmitting an advertisement or other message as a recognizable voice in accordance with the present invention.

FIG. 3 is a flow chart 300 illustrating an exemplary embodiment of a method for transmitting an advertisement or any other message as a recognizable voice message. A recognizable voice message as used herein shall mean a human voice. As illustrated in the flow chart 300, a voice stream of the advertisement or message is converted into a voice object as set forth at step 302. The voice object is then digitized as set forth at step 304. The digitizing may be accomplished in any number of ways utilizing well known techniques. The digitized voice stream is then compressed for transmission as set forth at step 306. The compression may be accomplished in any number of ways utilizing well known compression algorithms. The compressed, digitized voice stream is then transmitted as set forth at step 308. The compressed, digitized voice stream is received by the paging unit which comprises a decompression algorithm and the stream is decompressed as set forth at step 310. As set forth at step 312, the digitized voice stream is converted back into analog form. The voice stream may then be replayed by a voice synthesizer in the paging unit as set forth at step 314.

In yet another alternate embodiment, in addition to merely transmitting a voice replayed message, the advertisement or other message may be translated into a predetermined language prior to transmission as a voice replayed message. In other words, the paging service provider, upon request from the individual initiating the page, may provide for automatic translation from one language to another. For example, when an individual calls another individual's paging unit, the caller is presented with a menu of options from an automated response unit. Now in addition to the standard choices, language translation may be offered.

Figure 4:
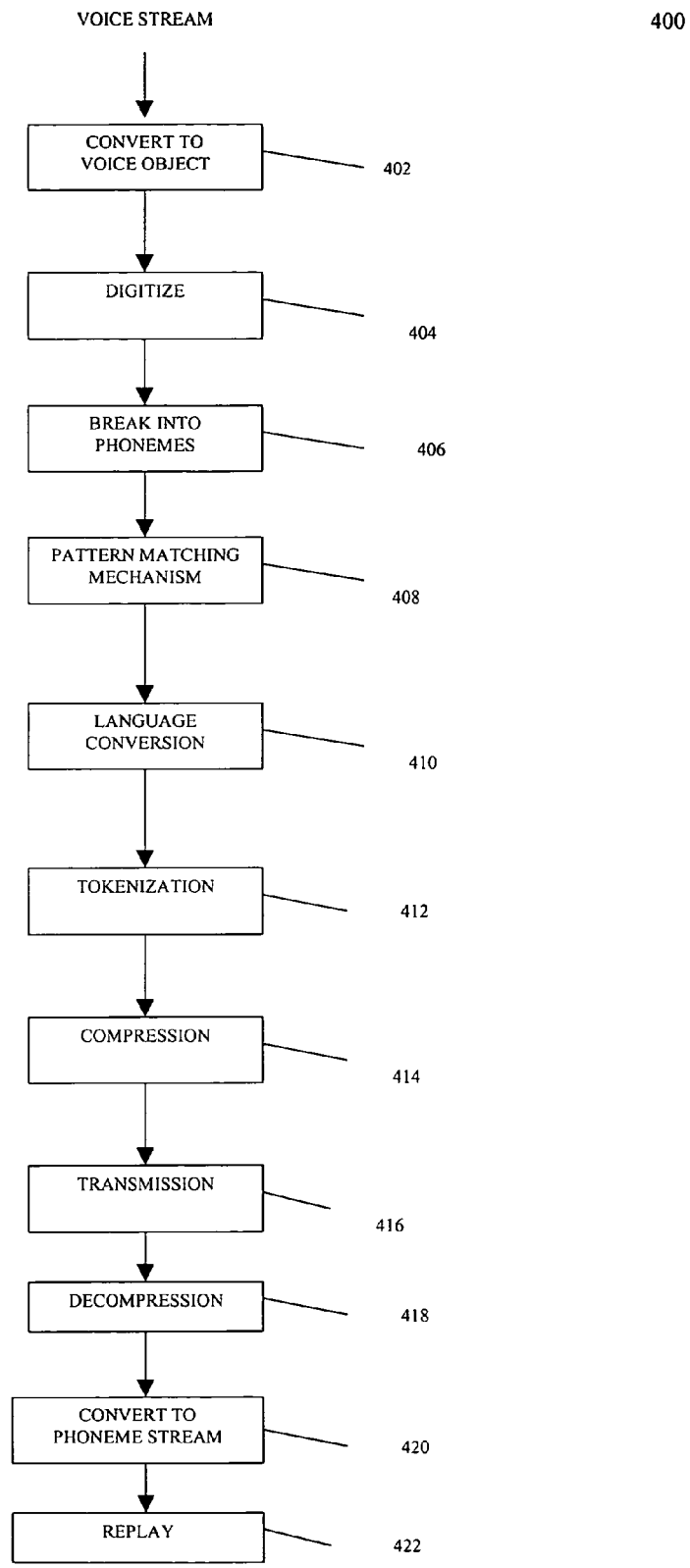
FIG. 4 is a flow chart of an exemplary embodiment of a method for transmitting and translating an advertisement or other message as a non-recognizable voice message in accordance with the present invention.

FIG. 4 is a flow chart 400 illustrating an exemplary embodiment of a method for transmitting an advertisement or any other message as a non-recognizable voice message and incorporating a translation feature. As illustrated in the flow chart 400, a voice stream of the advertisement or message is converted into a voice object as set forth at step 402. The voice object is then digitized in accordance with well known techniques as set forth at step 404. The digitized voice object is then broken down into phonemes as set forth at step 406. The phonemes are then run through a pattern matching mechanism, such as an artificial neural network or fuzzy logic system as set forth at step 408. Artificial neural networks and fuzzy logic systems are well known to those skilled in the art of computing. The pattern matching mechanism matches the phonemes to the phonemes of the words they are supposed to represent, for example, known words in the particular language. An advantage of utilizing a pattern matching mechanism, such as an artificial neural network or fuzzy logic system is that the speaker of the words may not be clear at certain times and the proper or intended word or words may not be correctly replayed by the paging unit. The pattern matching mechanism utilized in this exemplary embodiment may be utilized in the other embodiments discussed above. Once the proper words are determined by the pattern matching mechanism, they are translated into a predetermined language as set forth at step 410. Any number of well known translation schemes may be utilized as they are well known in the art. The translated phoneme stream is tokenized as set forth at step 412 and the tokenized translated phoneme stream is compressed for transmission as set forth at step 414. The compressed, tokenized phoneme stream is then transmitted as set forth at step 416. The compressed, tokenized phoneme stream is received by the paging unit which comprises a decompression algorithm and the phoneme stream is decompressed as set forth at step 418. As set forth at step 420, the tokenized phoneme stream is converted back into a phoneme stream utilizing a common phoneme stream set to that utilized in step 412. The phoneme stream may then be replayed by a voice synthesizer in the paging unit as set forth at step 422.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A method of messaging, comprising:
   generating an advertisement capcode that is separate from a programmed capcode of a paging unit, wherein the advertisement capcode is selectively assigned to the paging unit on a temporal basis by a service provider; and
   designating an advertisement script for transmission to the paging unit if the paging unit has been assigned the advertisement capcode.

2. A method according to claim 1, further comprising:
   storing the advertisement capcode in a central database;
   programming the paging unit with the advertisement capcode;
   correlating the advertisement capcode stored in the central database with the programmed capcode into the paging unit; and
   transmitting the advertisement script to the paging unit based upon the correlation.

3. A method according to claim 1, further comprising:
   transmitting a message along with the advertisement script to the paging unit.

4. A method according to claim 1, further comprising:
   crediting a subscriber account associated with the paging unit based on usage of the advertisement capcode.

5. A method according to claim 1, wherein the advertisement capcode is assigned to a plurality of paging units including the paging unit.

6. A method according to claim 1, further comprising:
unassigning the advertisement capcode from the paging unit.

7. A method according to claim 1, wherein the advertisement capcode is assigned based on a marketing criteria.

8. A method according to claim 1, further comprising:
receiving the advertisement script from an entity different from a provider of service for the paging unit.

9. A method for communicating within a paging network, the method comprising:
storing, in memory, an advertisement capcode for receiving an advertisement script, wherein the advertisement capcode is temporarily assigned to a paging device by a service provider of the paging network and is separate from a programmed capcode of the paging device, the advertisement script being retrieved based on the advertisement capcode.

10. A method according to claim 9, wherein the advertisement capcode is maintained in a central database by a service provider, the advertisement capcode being correlated with the programmed capcode.

11. A method according to claim 9, further comprising:
receiving the advertisement script with a message, wherein the advertisement script precedes the message.

12. A method according to claim 9, wherein a credit is earned by a subscriber of the paging network if the advertisement capcode is utilized.

13. A method according to claim 9, further comprising:
removing the advertisement capcode from the memory.

14. A method according to claim 9, wherein the advertisement capcode is assigned based on a marketing criteria including characteristics of a subscriber corresponding to the programmed capcode.

15. A method according to claim 9, wherein the advertisement script is created by an entity different from a provider of the paging network.

16. An apparatus of communicating within a paging network, the apparatus comprising:
a memory configured to store an advertisement capcode, temporarily assigned by a service provider of the paging network, for receiving an advertisement script, wherein the advertisement capcode is separate from a programmed capcode designated for receiving messages, the advertisement script being retrieved based on the advertisement capcode.

17. An apparatus according to claim 16, wherein the advertisement capcode is maintained in a central database by a service provider, the advertisement capcode being correlated with the programmed capcode.

18. An apparatus according to claim 16, further comprising:
an interface configured to receive the advertisement script with a message, wherein the advertisement script precedes the message.

19. An apparatus according to claim 16, wherein a credit is earned by a subscriber of the paging network if the advertisement capcode is utilized.

20. An apparatus according to claim 16, wherein the advertisement capcode is removed from the memory.

21. An apparatus according to claim 16, wherein the advertisement capcode is assigned based on a marketing criteria including characteristics of a subscriber corresponding to the programmed capcode.

22. An apparatus according to claim 16, wherein the advertisement script is created by an entity different from a provider of the paging network.

23. A method for providing a paging service, the method comprising:
receiving an advertisement script from a third party;
determining which one or more paging units is to receive the advertisement script based on a criteria;
transmitting the advertisement script to the one paging unit; and
crediting an account associated with the one paging unit.

24. A method according to claim 23, wherein the one paging unit is programmed with a plurality of capcodes, wherein one of the capcodes is designated for use to receive the advertisement script.

25. A method according to claim 23, wherein the advertisement script is replayed by the one paging unit as a voice signal.

26. A method according to claim 23, wherein the advertisement script includes wording of an advertisement and a date and time of when to broadcast the advertisement.

* * * * *